United States Patent
Walters et al.

(10) Patent No.: US 10,220,366 B2
(45) Date of Patent: Mar. 5, 2019

(54) PARTICLES COMPRISING STACKED GRAPHENE LAYERS

(71) Applicant: Perpetuus Research & Development Limited, London (GB)

(72) Inventors: Ian Walters, Ammanford (GB); Dylan Walters, Ammanford (GB)

(73) Assignee: PERPETUUS RESEARCH & DEVELOPMENT LIMITED, London (GB)

( * ) Notice: Subject to any disclaimer, the term of this patent is extended or adjusted under 35 U.S.C. 154(b) by 0 days.

(21) Appl. No.: 15/129,485

(22) PCT Filed: Mar. 27, 2015

(86) PCT No.: PCT/GB2015/050935
§ 371 (c)(1),
(2) Date: Sep. 27, 2016

(87) PCT Pub. No.: WO2015/145172
PCT Pub. Date: Oct. 1, 2015

(65) Prior Publication Data
US 2017/0174520 A1    Jun. 22, 2017

(30) Foreign Application Priority Data
Mar. 28, 2014 (GB) .................................. 1405614.7

(51) Int. Cl.
*H01L 21/02* (2006.01)
*B01J 19/08* (2006.01)
(Continued)

(52) U.S. Cl.
CPC ............. *B01J 19/08* (2013.01); *C01B 32/184* (2017.08); *C01B 32/225* (2017.08);
(Continued)

(58) Field of Classification Search
CPC ......... B82Y 30/00; B82Y 40/00; C01B 32/19; C01B 32/194; C01B 31/0469;
(Continued)

(56) References Cited

U.S. PATENT DOCUMENTS

2009/0117467 A1* 5/2009 Zhamu .................. H01M 4/133
429/231.8
2011/0111303 A1 5/2011 Kung et al.
(Continued)

FOREIGN PATENT DOCUMENTS

CN        102887506 A     1/2013
JP        2013054958 A    3/2013
(Continued)

OTHER PUBLICATIONS

Chen, et al., Amino Group Introduction Onto Multiwall Carbon Nanotubes by NH3/Ar Plasma Treatment, Carbon, 2010, 48:939-948.
(Continued)

*Primary Examiner* — Alexandre F Ferre
(74) *Attorney, Agent, or Firm* — Quarles & Brady LLP (57) ABSTRACT

According to the invention there is a particle including a plurality of stacked sub-structures, each sub-structure including a stack of graphene layers, in which the separation between successive stacked sub-structures is greater than the separation between successive graphene layers in each sub-structure.

31 Claims, 7 Drawing Sheets

(51) Int. Cl.
*C01B 32/225* (2017.01)
*C01B 32/184* (2017.01)
*B82Y 30/00* (2011.01)
*B82Y 40/00* (2011.01)

(52) U.S. Cl.
CPC .......................... *B01J 2219/0879* (2013.01); *B01J 2219/0894* (2013.01); *B82Y 30/00* (2013.01); *B82Y 40/00* (2013.01); *C01B 2204/04* (2013.01); *C01P 2004/03* (2013.01); *C01P 2004/61* (2013.01); *C01P 2004/62* (2013.01); *Y10S 977/734* (2013.01); *Y10S 977/842* (2013.01); *Y10S 977/846* (2013.01); *Y10S 977/847* (2013.01)

(58) Field of Classification Search
CPC ............ C01B 31/0484; C01B 2204/04; C01B 31/0492; C01B 32/168; C01B 32/192; C01B 32/225; C01B 17/02; C01B 2204/02; C01B 2204/22; C01B 2204/24; C01B 2204/32; C01B 31/0253; C01B 31/0423; C01B 31/043; C01B 31/0438; C01B 31/0476; C01B 32/174; C01B 32/188; C01B 32/22; C01B 32/23
See application file for complete search history.

(56) References Cited

U.S. PATENT DOCUMENTS

| | | |
|---|---|---|
| 2011/0157772 A1 | 6/2011 | Zhamu et al. |
| 2012/0048181 A1* | 3/2012 | Barker .................. B82Y 30/00 117/94 |
| 2012/0282527 A1 | 11/2012 | Amine et al. |
| 2013/0022530 A1* | 1/2013 | Mercuri ................. B82Y 40/00 423/447.1 |
| 2013/0171339 A1* | 7/2013 | Wang ...................... H01M 4/38 427/113 |
| 2013/0224452 A1 | 8/2013 | Ramaprabhu et al. |

FOREIGN PATENT DOCUMENTS

| | | |
|---|---|---|
| WO | 2004089820 A1 | 10/2004 |
| WO | 2012076853 A1 | 6/2012 |

OTHER PUBLICATIONS

Haydale Updates on Their Graphene Inks and GNPs, Expects Products Based on Graphene Inks by Early 2014, htttp://www.graphene-info.com/haydale-updates-their-graphene-inks-and-gnps, Oct. 13, 2013, 2 pages.

Haydale Ltd., HDPlas GNPs Plasma Functionalised Graphene NanoPlatelets Technical Data Sheet, Jun. 1, 2013, 2 pages.

Williams, et al., Effects of Plasma Modified Carbon Nanotube Interlaminar Coating on Crack Propagation in Glass Epoxy Composites, Composites: Part A, 2013, 54:173-181.

PCT International Search Report and Written Opinion, Application No. PCT/GB2015/050935, dated Jul. 31, 2015.

Intellectual Property Office, Search Report, Application No. GB1405614.7, dated Jun. 13, 2014.

* cited by examiner

PARTICLES COMPRISING STACKED GRAPHENE LAYERS

CROSS-REFERENCE TO RELATED APPLICATIONS

This application represents the national stage entry of PCT International Application No. PCT/GB2015/050935 filed on Mar. 27, 2015, and is based upon and claims the benefit of priority from Great Britain Patent Application No. 1405614.7 filed on Mar. 28, 2014, the entire contents of all of which are incorporated herein by reference.

This invention relates to particles, associated particulate material, and methods of making said particulate material. The invention relates also to composite material, particle dispersions and articles incorporating the particle material.

The last quarter of a century has seen remarkable advances in the field of nano-particles, including carbon or carbon containing nanoparticles. Reference is made to hitherto undiscovered allotropes of carbon such as various fullerenes, including carbon nanotubes (CNTs). Reference is also made to graphene, which is a single layer of graphite, and also to graphene containing nanoparticles such as graphene nano platelets (GNPs). There is a huge amount of interest in graphene and graphite-based materials in view of their remarkable electrical, thermal, mechanical and physical properties. Already, a huge amount of effort and expense has been put into the development of these materials and the exploitation of the remarkable properties. However, there are problems in manufacturing CNTs and graphene based materials, particularly for large-scale industrial applications. Furthermore, there are problems in handling these materials. The problems have so far been a barrier to commercial-level exploitation of materials such as CNTs and graphene based materials.

More specifically, it is well-known to synthesise CNTs and graphene containing materials such as GNP at low temperature using methods such as arc discharge and Catalytic Chemical Vapour Deposition (CCVD). It is also known to use acid intercalation of graphites, and to produce graphene from graphene oxide by thermal annealing, chemical, photocatalytic and plasma reduction. All of these methods, to a greater or lesser extent, offer a potential for relatively large-scale production. However, all of these methods result in an abundance of defects and disorder in the CNT and graphene containing products which are introduced by post material synthesis processes such as oxidation and exfoliation utilised to clean post production catalytic residues and liberate individual structures. Once synthesised, these problems are further compounded as conventional manipulation and functionalisation methods utilised to formulate graphenes and CNTs into a practical, useful material involves harsh, intensive mechanical and chemical processing. This further processing again degrades the surface of the material by generating additional defect sites. This occurrence is a common event irrespective of whether the materials produced are in sheet form, tubular (such as CNTs), or in other structural forms such as bucky balls, nano onions, or other graphene containing structures. The defects and disorders introduced by these prior art techniques severely degrade the materials' usefulness in any of the wide range of end applications which might be envisaged, such as use as a material enhancing filler, or as a facilitating component within any one of the wide range of devices for sensing, catalysis, or other high value end applications.

Additionally, many of the particles, such as CNTs and GNPs, are difficult to handle and to produce in an acceptable state owing to their very pronounced tendency to aggregate or agglomerate under the influence of van der Waals' forces. The inherently high "specific surface area" of nanoparticles, together with (for structures such as CNTs) a high aspect ratio, exacerbates this tendency. There is a need to provide nanoparticles exhibiting improved friability.

In addition, there is very substantial ongoing scientific and commercial interest in providing new classes of nanoparticles having desirable and/or improved properties and characteristics.

The present invention, in at least some of its embodiments, is directed to one or more of the problems, needs and desires disclosed above.

For the avoidance of doubt, it is understood that where the terms "includes" and "including" are used herein, the present specification also includes within its scope reference to the terms "comprises", "comprising", "consists essentially of", "consisting essentially of", "consists of" and "consisting of", i.e., the terms "includes" and "including" can be substituted with any of these other terms. According to a first aspect of the invention, there is provided a particle including a plurality of stacked sub-structures, each sub-structure including a stack of graphene layers, in which the separation between successive stacked sub-structures is greater than the separation between successive graphene layers in each sub-structure.

Particles of the invention can demonstrate excellent friability. An additional advantage is that substances can be intercalated within relatively large gaps between successive stacked sub-structures. A further advantage is that particles of the invention can be readily surface modified.

Generally, nanoparticles are considered to be particles having a characteristic dimension of less than 1000 nm. Particles of the invention may have a characteristic dimension of less than 1000 nm, but in some embodiments particles of the invention have characteristic dimensions (e.g., thickness and width) which are all 1000 nm or greater. The term "characteristic dimension", as is generally understood and as is used herein, relates to an overall dimension of the particle considered as a whole entity. However, in general the separation between successive sub-structures and the stack thicknesses of the sub-structures are less than 1000 nm.

The separation between successive stacked sub-structures may be at least 2 nm, preferably at least 5 nm, more preferably at least 10 nm. The separation between successive stacked sub-structures may be less than or equal to 100 nm, preferably less than or equal to 50 nm, more preferably less than or equal to 30 nm, most preferably less than or equal to 20 nm. The separation between successive stacked sub-structures may be in a range which extends from any of the lower bounds defined above to any of the upper bounds defined above. In particular, the separation between successive stacked sub-structures may be in the range 2 to 100 nm, preferably 5 to 50 nm, more preferably 10 to 30 nm, most preferably 10 to 20 nm.

The sub-structures may each have a stack thickness which is at least 0.7 nm, preferably at least 1 nm. The sub-structures may each have a stack thickness which is 15 nm or less, preferably 4 nm or less. The sub-structures may each have a stack thickness which is in the range 0.7 to 15 nm, preferably 0.7 to 4 nm. The sub-structures may each have a stack thickness which is in the range 1 to 15 nm or in the range 1 to 4 nm.

Each sub-structure may include a stack of between 2 and 12 graphene layers. Each sub-structure may include a stack between 2 and 4 graphene layers, preferably 3 graphene layers. It is possible for the particle to include single layers of graphene as well.

The sub-structures may be regarded as having some similarity to graphene nanoplatelets, since the basic sub-structure unit is a stacking of graphene layers. However, the number of layers of graphene, their separation, the stack height and the width of the sub-structures may be similar or dissimilar to GNPs. Additionally, the topography of sub-structures may be similar or dissimilar to GNPs. In a number of embodiments, the sub-structures and the particles themselves exhibit a wavy or undulating topography.

The sub-structures each have a stack thickness. The stack thicknesses may be less than the separation between successive stack sub-structures.

The particle may have a thickness in the range 0.7 to 5 microns, preferably 1 to 5 microns, more preferably 1.5 to 3 microns. For the avoidance of doubt, the term "thickness" relates to a dimension along which the sub-structures are stacked.

The particle may have a width in the range 1 to 15 microns, preferably 1 to 8 microns, more preferably 2 to 5 microns. For the avoidance of doubt, the term "width" relates to a dimension which is perpendicular or significantly perpendicular to the dimension corresponding to the thickness of the particle.

The sub-structures may have a nett negative charge. Without wishing to be bound by any particular theory or conjecture, it is believed that the presence of the nett negative charges may at least assist in producing and/or retaining the relatively large separations between successive stack sub-structures in relation to the separation between successive graphene layers in each sub-structure. Again without wishing to be bound by any particular theory or conjecture, it is believed that the presence of the nett negative charges may at least assist in enhancing friability.

The particle may have Stone-Wales defects. Each sub-structure may have Stone-Wales defects.

The particles may have a carbon content of greater than 80 wt. %, preferably greater than 90 wt. %.

The particle may have an oxygen content of less than 10 wt. %, preferably less than 5 wt. %, most preferably less than 1 wt. %.

At least some of the graphene layers in the sub-structures may be doped and/or surface modified.

At least some of the graphene layers may be surface modified by functionalisation. The functionalisation can be performed in order to tailor the chemical and/or physical properties of the particles. For example, mechanical and barrier properties can be improved. Examples of functionalisation include the formation of carboxyl, carbonyl, hydroxyl, amine, amide, oxo, oxide or halogen functionalities on the surfaces of the particles. Amine functionalisation or functionalisation using nitrogen can be used to enhance electrical conductivity.

At least some of the graphene layers may be surface modified by decoration with a material. The material may be silicon, sulfur, selenium, or a metal. The metal may be a transition metal. The metal may be one or more of silver, gold, platinum, copper and iron. Decoration with a metal can provide one or more of enhanced electrical conductivity, enhanced thermal dissipation, catalytic capability, magnetism and antimicrobial activity. The term 'decoration' is understood to refer broadly to the deposition of one or more materials onto the particle. Decoration may be in the form of a coating of the material. Alternatively, decoration may be in the form of a plurality of discrete deposits of the material at a number of different sites on the particle. In these embodiments, surface modification may be manifest as a plurality of discrete structures or 'islands' of material. Particles may be provided which are decorated with a plurality of discrete structures or 'islands' of silicon. This gives rise to useful properties, such as an ability for the silicon structures to expand and contract independently of each other. This provides the potential for the material to cope with multiple electrical charge-discharge cycles.

At least some of the graphene layers may be doped with a dopant species. The dopant species may be one or more of N, B, S, Se, and a halogen atom, preferably F.

N doping provides N-type (negative) graphene-like structures, which can improve electronic conductivity. Nitrogen doping has proved to be an effective method to improve both microstructure and electrochemical properties.

Boron doping gives rise to P-type (positive) graphene-like structures. P-doped structures may provide catalytic activity.

S and Se doping can provide catalytic activity.

Fluorine doped particles can exhibit high hydrophobicity and semiconductor properties. F doping to around 10 wt % can provide substantial hydrophobicity. F doping to around 50 wt % can provide an excellent semiconductor.

The particle may further include an intercalated substance which is intercalated between successive stacked sub-structures. Particles of the invention can exhibit gaps between successive stacked sub-structures which are convenient for intercalating a range of useful substances.

The intercalated substance may be sulfur.

The intercalated substance may be hydrogen.

According to a second aspect of the invention there is provided particulate material including a plurality of particles of the first aspect of the invention.

The particulate material may have a surface area in the range 15 to 70 $m^2g^{-1}$ preferably about 25 $m^2g^{-1}$.

The particulate material may be crystalline. It is advantageous that the particulate material may be non-amorphous, and in fact particulate material with a high degree of crystallinity may be produced.

The particulate material may be made by subjecting a starting material to a plasma treatment. The particulate material may be made according to any method described in the third aspect of the invention.

According to a third aspect of the invention there is provided a method of making particulate material of the second aspect of the invention including subjecting a starting material to a plasma treatment.

The plasma treatment may include generating plasma using a plurality of electrodes which are moved during the plasma treatment to agitate the starting material and/or the particulate material. Apparatus suitable for making particulate material of the invention are described in the Applicant's copending International application PCT/GB2014/053352, filed on 12 Nov. 2014, and UK patent applications 1322764.0, filed on 22 Dec. 2013, and 1319951.8, filed on 12 Nov. 2013, the entire contents of all of which are herein incorporated by reference. These documents also disclose methodologies which may be adapted to produce particulate material of the invention. Without wishing to be bound by any particular theory or conjecture, it is believed that the electrodes provide intimate contact between the starting material and/or the particulate material and a high density of one or more of molecules, atoms, sub-atomic particles and photons at positions close to the electrodes. This displaces atoms in the starting material and/or the particulate material and provides defects such as Stone Wales defects that provide anchor points e.g., to host functionalities and/or decorations and/or cause graphene sheets to bend, assume a wavy topography and/or provide the gaps between sub-structures. A Stone Wales defect is a rearrangement of five or seven member rings in a hexagonal network. It is caused by the rotation of two carbon atoms by 90° and is one of the most important defective structures for enabling surface engineering of graphene and CNTs.

The invention provides numerous ways in which the starting material and/or the particles can be treated. These are discussed below.

i) Exfoliation

The plasma treatment may include an exfoliating plasma step for exfoliating the starting material. The exfoliating plasma step may use a noble gas plasma. A noble gas is understood to be a gas of Group 18 of the periodic table. The exfoliating plasma step may use an argon plasma.

ii) Cleaning

The plasma treatment may include a cleaning plasma step. The cleaning plasma step may use a plasma in an oxygen containing gas, such as an oxygen plasma. Mixtures with inert gases may be used.

The order of the cleaning and exfoliating steps is interchangeable. However, good results have been obtained performing a cleaning step before an exfoliation step.

iii) Functionalisation, Intercalation and Doping

The present invention permits ready plasma functionalisation of the particles. Intercalation between sub-structures is possible. Doping can be performed to introduce dopants into the bulk structure of the particles. The particles may be doped with an analyte species. The plasma may be generated using suitable precursor gases or gaseous mixtures which include one or suitable precursor gases. Suitable precursor gases include oxygen, water, hydrogen peroxide, alcohol such as methanol, nitrogen, ammonia, organic amines, halogens such as fluorine and chlorine, and halogenated hydrocarbons, including per-halogenated hydrocarbons such as $CF_4$. B doping may be performed using $B_2H_6$ vapour in a hydrogen carrier gas. The use of functionalisation and doping procedures which do not employ a plasma is also within the scope of the invention. Functionalisation can proceed using a suitable chemical reaction such as silanisation, amidation, esterisation, substitution, and cycloaddition. An initial functionalisation step using oxygen can be beneficial since relatively reactive oxygen functionalities are produced which can be used as sites for a subsequent functionalisation reaction.

iv) Decoration

The treatment may be performed to decorate the surface of the particles with a decoration material. The decoration material may be a metal. The metal may be silver, platinum or gold. Metal decoration may be performed by producing a plasma using electrodes formed from or coated with the decorant metal. Alternatively, known sputtering techniques may be used.

Silicon decoration may be performed using a plasma treatment with a suitable silicon containing precursor gas or vapour such as a siloxane. An example of a precursor is hexamethyldisiloxane.

v) Repair

The invention may include a step to repair the particles. The repair may include or consist of repairing defects such as mono or multiple vacancies formed by the loss of one or more atoms from the structure of the particles.

The plasma repair treatment may be a plasma enhanced chemical vapour deposition (PECVD) process.

When the objective is repair of the particles, plasma may be generated in a carbon containing gas or a gaseous mixture including a carbon containing gas. The carbon containing gas may be a hydrocarbon, an alcohol, or a halocarbon. Examples of suitable gases include methane, methanol and carbon tetrachloride. Carbon monoxide and carbon dioxide are further candidates. In one preferred embodiment, the plasma is generated in pure methane or in a gaseous mixture which consists essentially of methane.

For the avoidance of doubt, the term 'gas' as used herein includes any substance introduced to the plasma in gaseous form, including the gaseous component of a volatile liquid such as a siloxane.

vi) Generating Stone Wales Defects

Stone Wales defects can further push sub-structures apart, providing enhanced friability. Stone Wales defects may act as anchor points for functionalisation, decoration and doping.

The method may include a finishing treatment. The finishing treatment may be performed to produce a desired effect or property. The finishing treatment may include a high temperature treatment and/or a plasma treatment.

The finishing treatment may include a microwave induced finishing treatment. Preferably, the microwave induced finishing treatment is a microwave induced plasma treatment. The particulate material may be directly exposed to microwave radiation. A microwave oven may be used to directly expose the particulate material to microwave radiation. A microwave induced finishing treatment may be used on convert particles which are coated with silicon to provide particles having a plurality of discrete structures or 'islands' of silicon.

The plasma treatment may utilise a glow discharge plasma. Plasmas of this type are convenient to implement and have been found to produce good results.

Generally speaking, glow discharge plasma is a low pressure plasma. The pressure used to generate the glow discharge plasma is typically 10 Torr or less. Preferably, the pressure used is 5 Torr or less, more preferably 1 Torr or less, more preferably still, 0.5 Torr or less, and most preferably 0.1 Torr or less. The pressure used is typically 0.001 Torr or greater, and often 0.01 Torr or greater. For the avoidance of doubt, ranges of pressures corresponding to all possible combinations of these upper and lower pressure limits are within the scope of the invention.

In general, the glow discharge plasma is formed by the passage of electric current through a low-pressure gas. The glow discharge plasma may be formed using DC, AC or RF voltages.

Although it is preferred to use glow discharge plasma, it is possible to generate other types of plasma. For example, atmospheric plasmas, near atmospheric plasmas, or plasmas utilising pressures up to several atmospheres might be utilised. Alternatively, other forms of low pressure plasma might be used.

Plasma is formed in a localised region around each working electrode. In combination with the use of a plurality of electrodes to agitate the particles during the plasma treatment, this feature enables the interaction between the plasma and the particles to be well controlled. It can also enable advantageous processing conditions to be created and controlled.

The starting material may include a graphitic carbon material. The graphitic carbon material may be a material containing graphene stacks such as GNPs, fullerenes such as bucky balls and CNTs, or a mixture thereof.

Alternatively, the starting material may include a clay or another carbon containing mineral.

According to a fourth aspect of the invention there is provided a composite material including particulate material of the second aspect of the invention dispersed in a matrix material. The matrix material may be a polymer. The polymer may be thermoset polymer or a thermoplastic. The polymer may be synthetic or a natural polymer such as a biopolymer. The polymer may be an epoxy-based polymer, a polyolefin such as polyethylene or polypropylene, polyurethane, polyester, polyamide, an acrylic polymer or a methacrylic polymer. The polymer may be a homopolymer or a co-polymer of suitable type.

The use of the particles in the product of a composite material can result in enhanced mechanical properties. Other advantageous properties which can be exhibited by composite materials of the invention include at least one of:
- improved Tg;
- improved fire retardancy;
- improved barrier properties; for example resistance to liquid and/or gas ingress;
- shielding against electromagnetic interference such as RF interference; and
- dissipation of electrostatic charge.

According to a fifth aspect of the invention there is provided a particle dispersion including particulate material of the second aspect of the invention dispersed in a liquid medium.

According to a sixth aspect of the invention there is provided an article including particulate material of the second aspect of the invention. The article may be a device.

Whilst the invention has been described as above, it extends to any inventive combination to the features set out above, or in the following description, drawings or claims. For example, any features described in relation to any one aspect of the invention is understood to be disclosed also in relation to any other aspect of the invention.

Embodiments of particles and methods of making same in accordance with the invention will now be described with reference to the accompanying drawings, in which:—

FIG. 8 shows (a) an exploded perspective view and (b) a side view of an end plate having a plurality of electrodes disposed therein.

Figure 1:
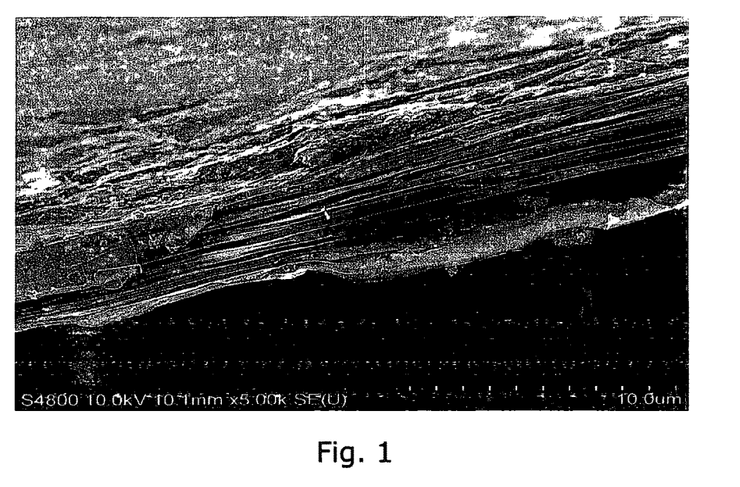
FIG. 1 is a SEM (scanning electron microscope) image of graphitic starting material.
Figure 2:
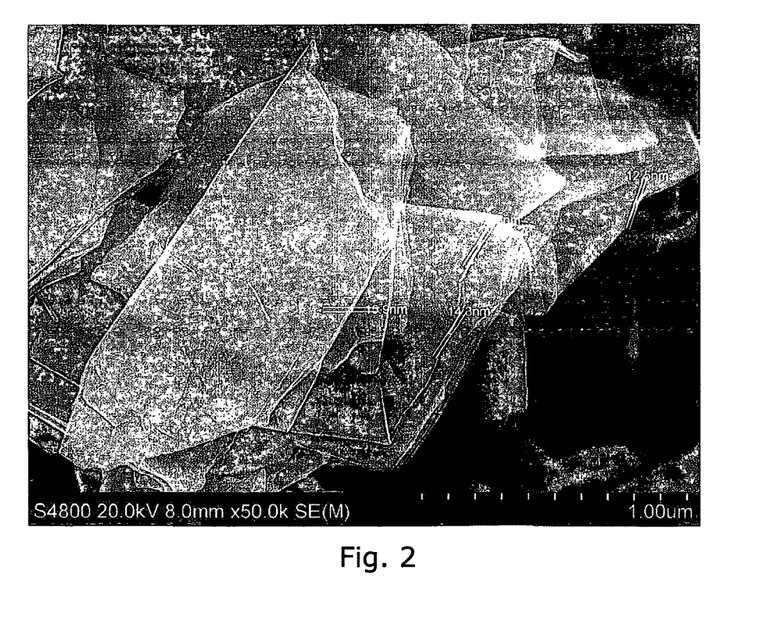
FIG. 2 is a SEM image of a particle.
Figure 3:
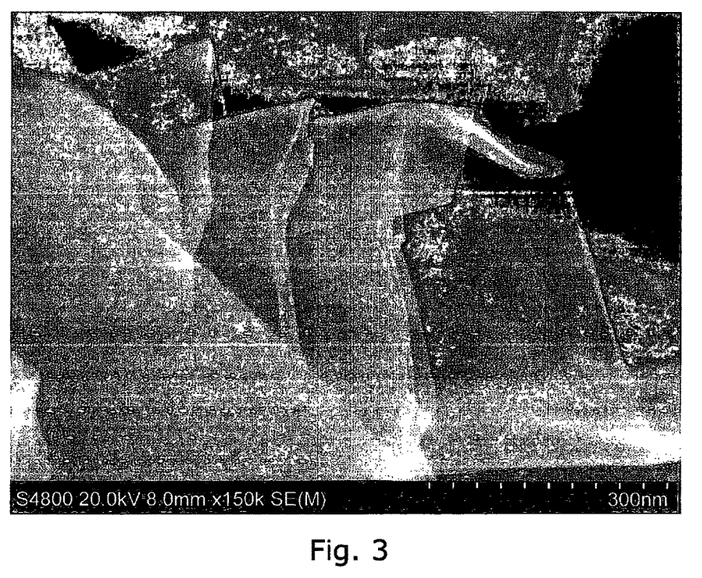
FIG. 3 is a SEM image of a particle at a higher resolution than FIG. 2.

FIG. 1 is a SEM image of graphite which may be used as the starting material to produce particles of the invention. FIGS. 2 and 3 are SEMs of particles of the invention. Significant exfoliation has taken place, and the material has been cleaned. The particles are in the form of a stacking of a plurality of sub-structures. FIG. 2 shows measurements of the gap between successive sub-structures. It can be seen that gaps of 12.5 nm, 14.3 nm and 15.9 nm are measured. FIG. 3 shows the gaps between successive sub-structures in greater detail. It can be seen that in some instances the edges of successive sub-structures are more or less in alignment. Quite commonly, there are observed a first plurality of successive sub-structures having edges which are substantially in alignment, followed by a second group of successive sub-structures having edges which are substantially in alignment but which are not aligned with the first plurality of sub-structures, and so on. It has been shown that each sub-structure comprises a number of layers of graphene. Typically there are up to about ten layers of graphene in each sub-structure. Often, sub-structures are observed to have about three graphene layers with a sub-structure thickness of about 2.1 nm. The gaps between successive layers of graphene in each sub-structure are considerably smaller than the gaps between successive sub-structures. Typical gaps between successive graphene layers in the sub-structures are 0.5-0.8 nm. It will be appreciated that individual graphene layers are not resolved in FIGS. 2 and 3, and instead the sub-structures appear as apparently discrete features.

XRD analysis has revealed that particles of the invention such as those shown in FIGS. 2 and 3 exhibit a high degree of crystallinity, with both the alpha graphitic form (hexagonal) and the beta graphitic form (rhombohedral) being observed.

Without wishing to be bound by any particular theory or conjecture, it is believed that the sub-structures have a nett negative charge which acts to keep them apart. This gives rise to the relatively large separations between sub-structures. It is believed that the relatively large gaps between sub-structures give rise to a number of highly advantageous properties. Firstly, it is believed that these relatively large gaps improve friability, and permit easy dispersion via, for example, shear type forces or sonication. This gives rise to improved packaging, handling, and incorporation into liquid media or matrix material, for example to produce composite materials. In contrast, prior art nanoparticles such as CNTs, GNPs and single flakes of graphene are notoriously difficult to handle, and commonly exhibit a high degree of entanglement and poor friability.

Figure 4:
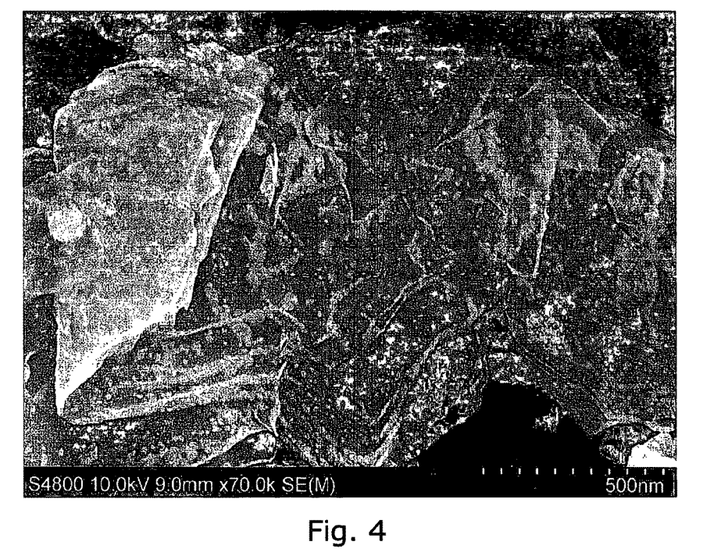
FIG. 4 is a SEM image of a particle decorated with silicon nano-pods.

A further advantage associated with the relatively large gaps between successive sub-structures is that a range of materials can be intercalated into particles of the invention. Examples of materials which may be intercalated in this way include sulfur and molecular hydrogen. The particles may be modified in other ways. This may be instead of, or in addition to, intercalation. For example, the particles may be functionalised in a desired way. Particles of the invention can be readily decorated with a range of materials. Decoration with silicon can be performed. The particles can be essentially coated with silicon. However, the invention also provides a form of silicon decorated particle where the silicon decoration is present as a plurality of discrete structures or "islands". FIG. 4 is an SEM of particles of the invention decorated with silicon in this way. It can be seen that the silicon is present as a plurality of discrete "nano-pods" having dimensions less than 500 nm and often less than 100 nm. This gives rise to useful properties, such as an ability for the silicon nano-pods to expand and contract independently of each other. This provides the potential for the material to cope with multiple electrical charge-discharge cycles.

Figure 5:
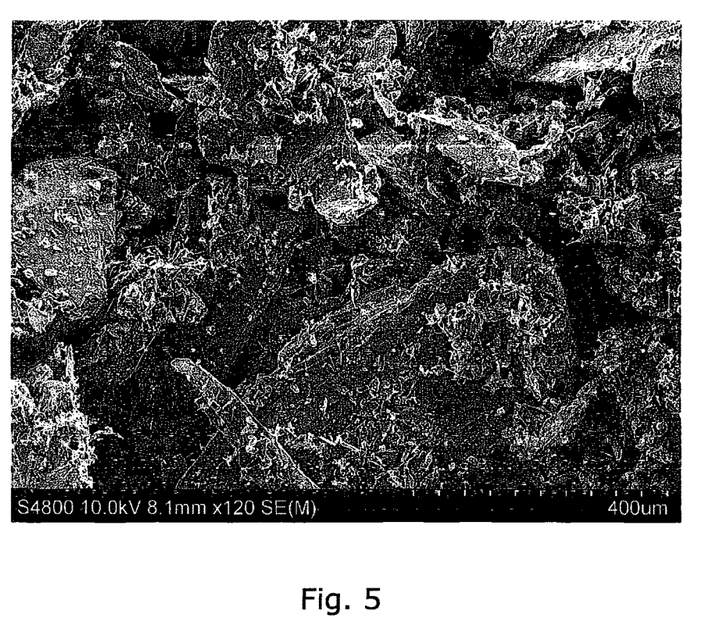
FIG. 5 is a SEM image of a particle decorated with a metal.

The particles may be decorated with a metal. FIG. 5 is an SEM showing particles of the invention decorated with silver. Table 1 shows an elemental analysis of particles of the invention decorated with silver.

TABLE 1

Elemental analysis of silver decorated with particles.

| Element | Weight % | Atomic % | Compound % | Formula |
|---------|----------|----------|------------|---------|
| C K     | 70.90    | 93.77    | 0.00       |         |
| O K     | 1.97     | 1.95     | 28.46      | $OAg_2$ |

TABLE 1-continued

Elemental analysis of silver decorated with particles.

| Element | Weight % | Atomic % | Compound % | Formula |
|---------|----------|----------|------------|---------|
| Al K    | 0.63     | 0.37     | 0.00       |         |
| Ag      | 26.50    | 3.90     |            |         |
| Total   | 100.00   |          |            |         |

Figure 6:
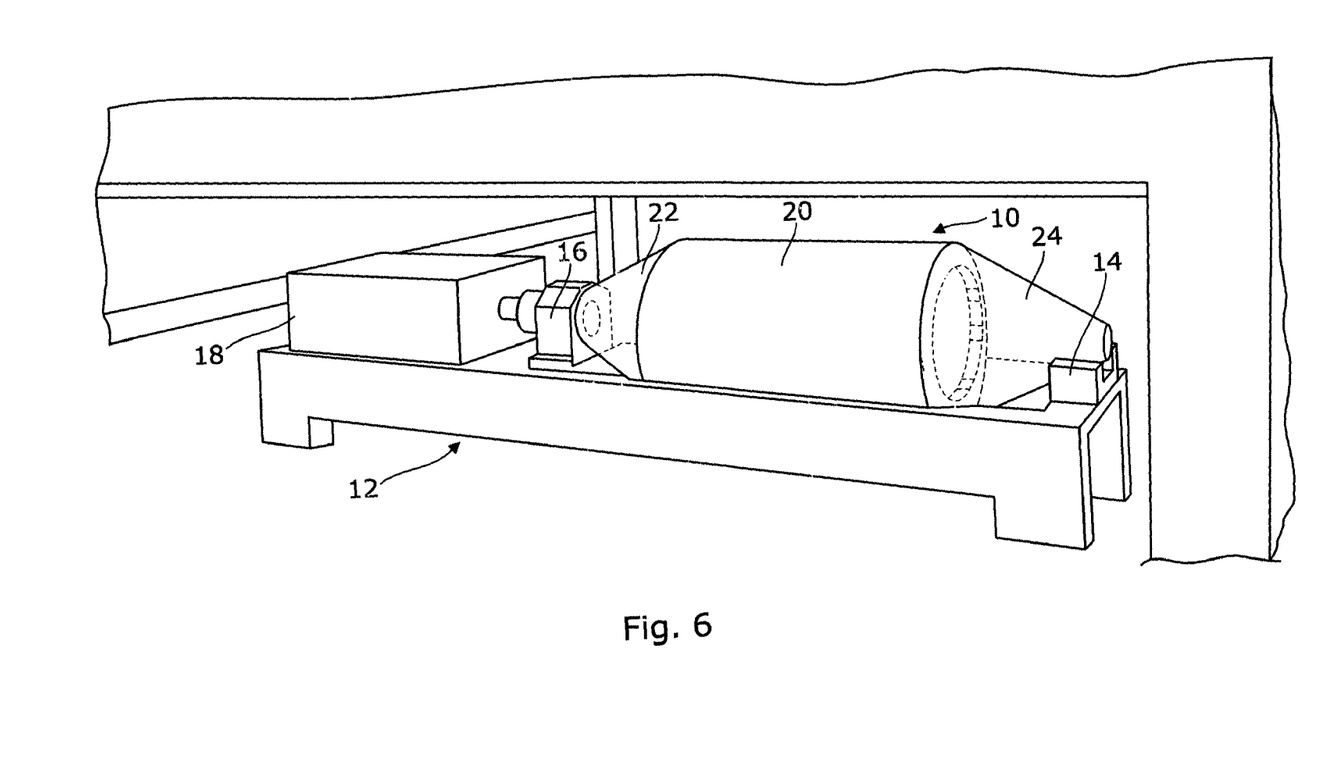
FIG. 6 is a perspective view of apparatus of the invention.

Apparatus suitable for producing particles of the invention will now be described. FIG. 6 shows a suitable treatment chamber 10 positioned on a bed 12 through coupling portions 14, 16. The coupling portion 16 is in operative connection with a suitable motor or actuator disposed in a housing 18. The motor or actuator is coupled to the treatment chamber 10 so that, in operation, the treatment chamber 10 may be rotated at a desired rotational speed.

The treatment chamber 10 is a three-part modular arrangement comprising a central drum 20 and first and second frusto-conical sections 22, 24. The first frusto-conical section 22 is in contact with the receiving portion 16, and second frusto-conical section 24 is in contact with the receiving portion 14 so as to allow the treatment chamber 10 to be rotated. The drum 20 and first and second frusto-conical sections 22, 24 can be formed from any suitable material, such as stainless steel.

Figure 7:
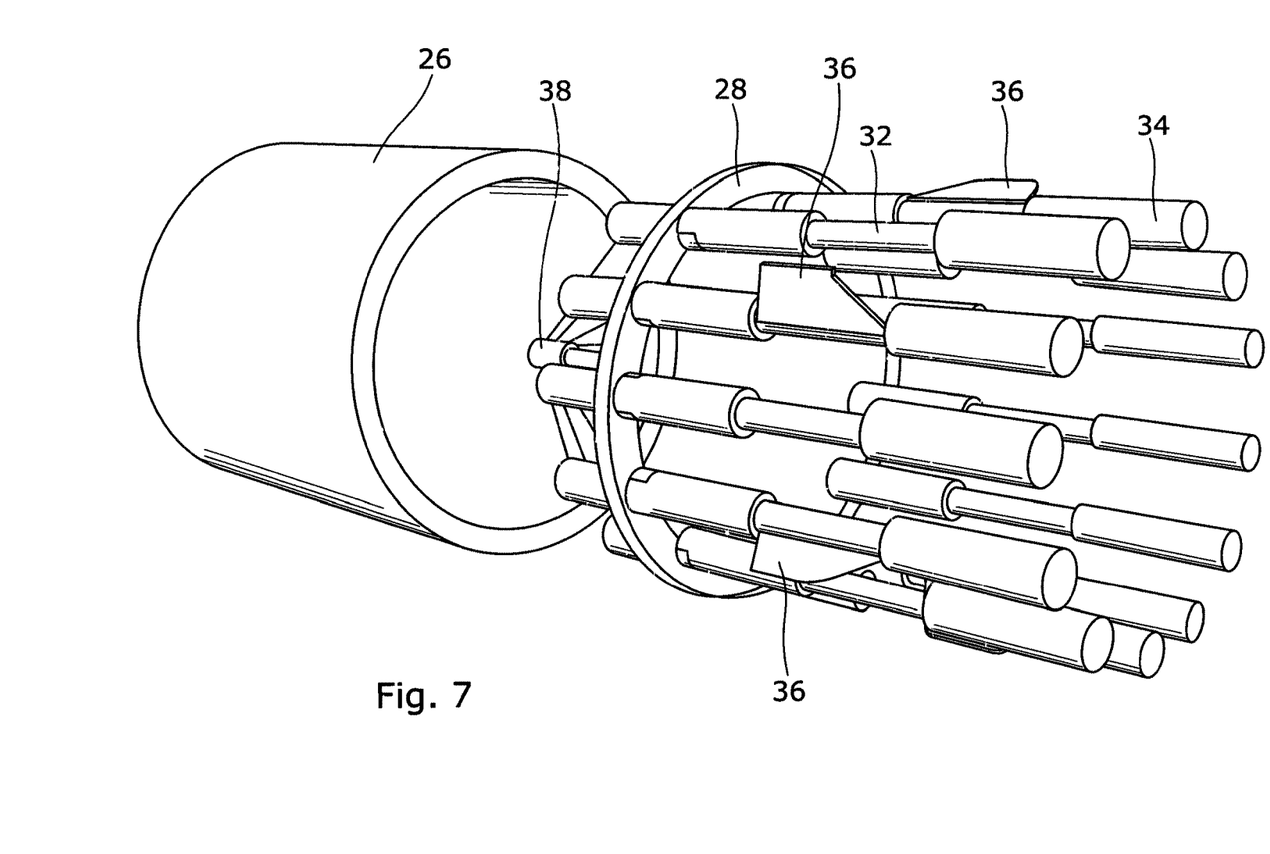
FIG. 7 is an exploded view of the interior of the rotating drum.

FIG. 7 shows the internal arrangement of the drum 20 in more detail. In particular, the drum 20 comprises a cylindrical portion 26 and a first circular end plate 28. The first end plate 28 is in communication with the first frusto-conical section 22. A second circular end plate (not shown) is positioned at the end of the cylindrical portion 26 opposite the first end plate 28 and is in communication with the second frusto-conical section 24. A plurality of electrodes 32 project out of the first end plate 28 into the interior of the drum 20. The electrodes 28 are radially disposed around the longitudinal axis of the drum 20 in a circular pattern. As shown in FIG. 7, the electrodes are equally spaced, although it is not critical that this is so. The electrodes 28 are arranged towards the circumferential edge of the first end plate 28. As explained in more detail below, this arrangement is preferred in order to provide agitation of particles which are disposed in the treatment chamber in order to undergo plasma treatment. In the embodiment shown in the figures, an arrangement of twelve electrodes project into the treatment chamber. However, a greater or a lesser number of electrodes might be used. In the embodiment shown in the figures, the electrodes 32 are formed from an electrically conductive material such as stainless steel. Isolator sleeves 34 formed from an electrically insulating material such as ceramic are disposed at both ends of each electrode 32. The sleeves may be coatings on the electrodes. The electrodes should generally be arranged to project a significant way into the chamber. The active plasma producing areas of the electrodes may be coated with a conductive ceramic coating such as boron silicate glass. This can act to reduce unwanted sputtering.

The supply and removal of gases to and from the treatment chamber 10 will now be described with particular reference to FIG. 8 which shows a gas inlet module 38 (also shown in FIG. 7) which is in gas conducting connection with a plurality of gas inlet lines 40. Each gas inlet line 40 is connected to an electrode 32. Each electrode 32 is hollow, having an internal gas conducting conduit (not shown) leading to a gas outlet aperture at the distal end of each electrode 32 (not shown). The gas inlet module 38 is housed in the first frusto-conical section 22, and is supplied with the gases to be used during plasma processing from one or more external gas supply sources (not shown). The supply of gas can be controlled using known means such as mass flow controllers.

The first end plate 28 has an exhaust port 42 formed therein. As shown in FIG. 8(b), a filter 44 is disposed in the exhaust port 42. The exhaust port 42 is in connection with a pumping arrangement (not shown) which is used to create a vacuum in the treatment chamber and to pump away process gases in a manner which is well-known to the skilled reader.

Rotatable drum chambers are available commercially and may be adapted in order to produce apparatus of the invention. For example, a rotating drum plasma reactor is produced commercially by Diener Electronic GmbH & Co. KG, D-72224 Ebhausen, Germany having the product name "Tetra 500"®. This apparatus may be adapted in accordance with the invention, for example by providing the plurality of electrodes described above.

In use, a charge of the starting material is disposed on the floor of the drum 20. The chamber is evacuated to a desired baseline pressure, and the process gas or gases are introduced into the treatment chamber 20 through the electrodes 32. The treatment chamber 10 is rotated at a desired rotational speed. A plasma is generated at each electrode 32 in order to initiate processing of the particles. During the processing of the particles, the electrodes 32 are rotating, and this acts to continuously agitate the charge of particles in the treatment chamber. The particles may be physically transported through this agitation, for example through sideways displacement of the particles, or by way of the particles being thrown upwards the interior of the chamber. Scoops 36 can significantly assist in the process.

Figure 8A:
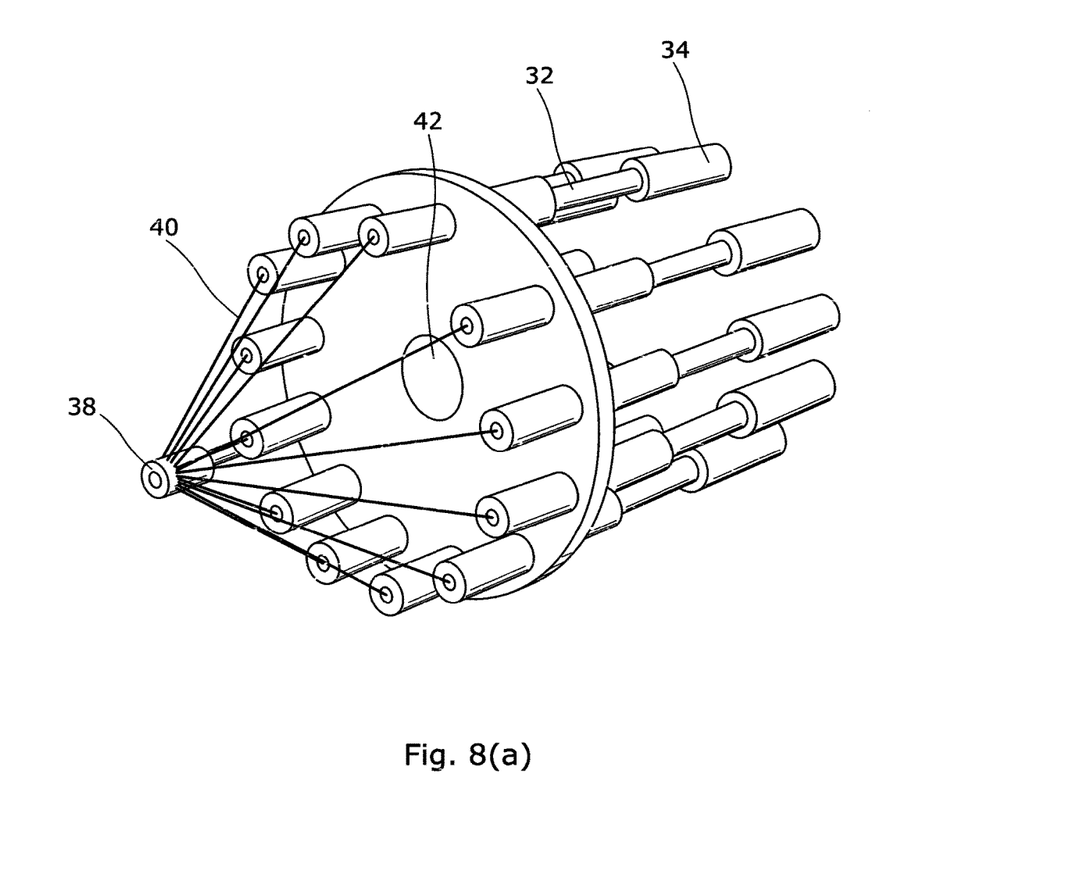
Figure 8B:
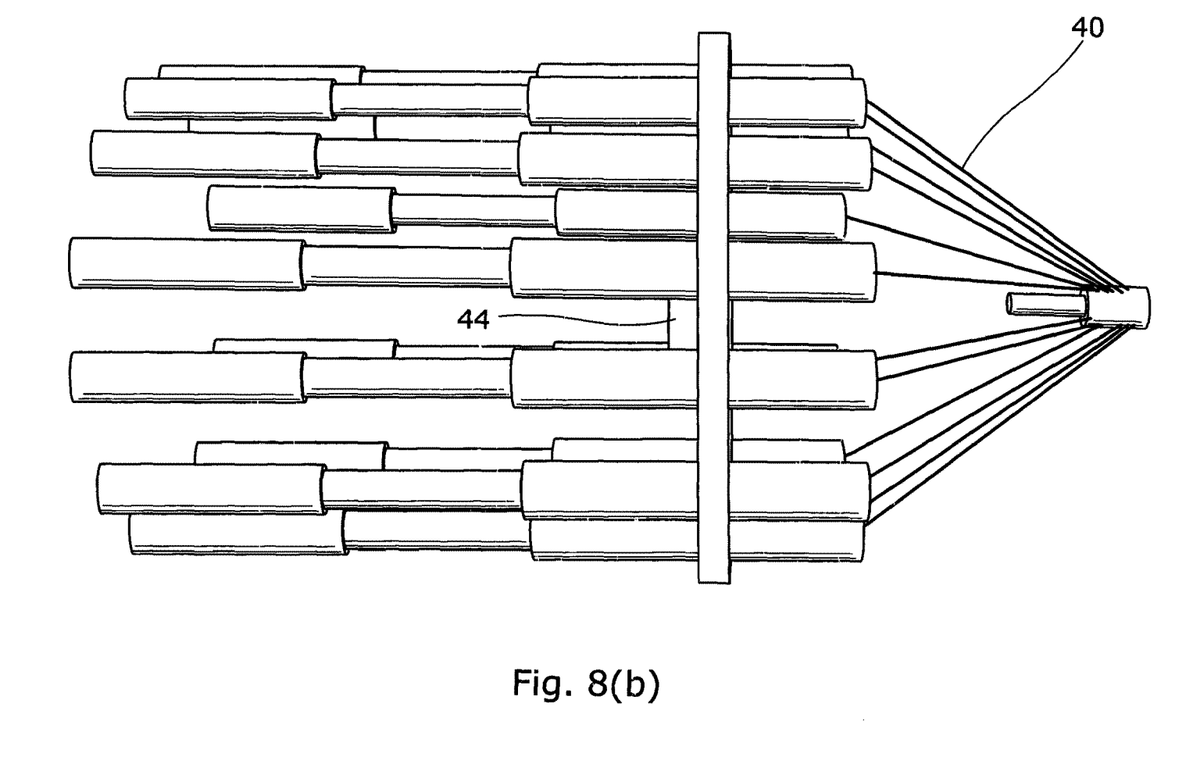

In the embodiment shown in FIGS. 6 to 8, glow discharge plasmas are formed at each electrode 32. RF power is applied to electrode 32. A convenient RF frequency such as 13.56 MHz may be used. The electrodes 32 thereby act as working electrodes in a glow discharge system. A counter-electrode is provided, and conveniently this can be the inner surface of the drum 20 which might be coated with a conductive ceramic such as boron silicate glass. The RF power establishes a negative DC bias voltage on the electrodes 32 which thereby act as cathodes in the flow discharge system. It is also possible to use other methods to obtain glow discharge plasmas, such as through the application of a DC voltage through electrodes 32. Other forms of plasma might be utilised instead.

Localised plasmas are generated around each electrode 32, but the process conditions are selected so that these plasmas are discrete and separated from one another. In this way, each electrode is surrounded with a plasma halo which contains clouds of energetic electrons, UV photons, ions and, typically, reactive neutral species. This rich plasma is used to produce the particles. The use of multiple electrodes increases the number of electron clouds and other useful species associated with the plasmas, and this has beneficial effect on processing efficiency. Additionally, the use of the electrodes to agitate the particles to be treated can also have a beneficial effect on processing efficiency as well as improving the results achieved.

The apparatus may be used to exfoliate a graphitic starting material. Typically a high plasma power is utilised, at least in the initial stages of the process, to facilitate ion bombardment and ion intercalcation of the target material. For example, powers of up to 2000 W can be used. Effective bombardment and intercalcation causes layers of the starting material such as graphite to exfoliate. Without wishing to be limited by a particular theory or conjecture, it is believed that a result of this is that a nett negative charge is imparted onto the exfoliated layers so that they can push off from each other. This charge overcomes attractive van der Waals' forces, thereby retarding the usual inclination of the particles produced by the exfoliation to reagglomerate. A plasma formed in argon or oxygen is effective in producing exfoliation.

A cleaning step may be provided before, during or after the exfoliation step. An oxygen plasma is an advantageous means of cleaning. Representative but non-limiting process conditions are a temperature of less than 100° C. with a plasma power of 120 W for around thirty minutes at a pressure of 1.5 Torr. Higher powers can be used.

A further possibility is to remove particles from the multi-electrode treatment chamber to a final stage treatment chamber using vacuum transfer or other appropriate means. The final treatment chamber may be used to facilitate high temperature processing which will provide additional treatment options, for example for decorating the particles with a desired material. The final stage treatment may be a microwave induced plasma treatment. In these embodiments, the final treatment chamber may have glass windows and an inner surface coated with a ceramic or glass. Appropriate wave guides are used to couple microwave energy into the chamber through the windows. The final treatment chamber can be configured to rotate in order to agitate the particles. A modified version of the Tetra 500 product described above can be used for this purpose. In another alternative, a final treatment step such as this can be performed in the original treatment chamber. In these embodiments, the original treatment chamber is provided with microwave means to generate the microwave induced plasma. The multi-electrode array can be used for this purpose if the electrodes are made from suitable materials such as a conductive glass, for example boron silicates.

A potential problem during processing is electrical shorting of the electrodes. This can be at least ameliorated by reducing the plasma power as the processing continues. The likelihood of shorting occurring increases if the material volume increases during processing which is likely to occur if deagglomeration and/or disaggregation occurs. One approach which may be adopted is to reduce the plasma power as the volume of the particles increases. For example, an inverse relationship between the volume of the particles and the applied plasma power, or another relationship determined by routine investigation may be followed.

EXAMPLES

Example 1

Production of Particles.

The apparatus described in relation to FIGS. 6-8 was used. The reactor was charged with milled graphite. Other graphitic material such as graphene stacks, CNTs, fullerenes (such as bucky balls) or a mixture thereof may be used. Processing was performed with an oxygen plasma for a minimum of 10 minutes and a maximum of 60 minutes with the reactor barrel rotating at more than 30 rpm. This was followed by an argon exfoliation treatment under similar process conditions. Powers of up to 2000 W were employed. A reactor pressure in the range 0.4 to 1.5 m Bar and gas flow rates of up to 1500 sccm were employed. This resulted in the formation of particles as shown in FIGS. 2 and 3. During the oxygen cycle UV photons and/or ions bombard the surface creating mono, di and tri vacancies which provide sites for oxygen groups. The argon exfoliation cycle also has the effect of cleaning off oxygen groups, leaving sites for bonding desired moieties to the surface during a further process stage.

Example 2

Silicon Decoration.

Particles were produced in accordance with Example 1. After the argon exfoliation step, hexamethyldisiloxane in an argon carrier gas was introduced into the chamber via a bubbler system. A plasma was generated during a treatment which lasted for 10-60 minutes. It was found to be advantageous to rotate the reactor at 1 rpm to evenly expose the particles to the plasma but to avoid over exposure to UV photons.

The resulting material comprises particles which are substantially coated with silicon.

Example 3

Silicon Nano-Pod Decorated Particles.

The silicon coated particles of Example 2 were subjected to a further treatment step using a microwave treatment. Most specifically, the material was subjected to a microwave induced plasma. This resulted in the formation of silicon nano-pods on the surface of the particles as shown in FIG. 4.

Example 4

Metal Decoration.

Particles produced in Example 1 were subjected to a further process step. The apparatus described in relation to FIGS. 6-8 was utilised. The electrode array consisted of electrodes coated with the metal or metals of choice. Examples of suitable metals are Au, Pt, Ag, Cu, and Fe. Process times of 10-180 minutes can be used. The barrel can be rotated at 1 rpm. The plasma was sustained in an argon atmosphere. This resulted in the formation of metal coated particles as shown in FIG. 5.

Example 5

Metal Decoration and Functionalisation.

Metal decoration was performed in addition to functionalisation with nitrogen or oxygen functional groups. The method described in Example 4 was performed, with the exception that instead of sustaining the plasma in argon, the plasma was sustained using nitrogen or oxygen gas.

Example 6

Sulfur Intercalation

The method described in Example 1 was performed, except that the starting material included dry sulfur powder as well as the graphitic starting material. A mixture of 20 wt % sulfur/80 wt % graphitic starting material produced good results, although ratios down to around 50 wt % sulfur/50 wt % graphitic starting material may be used.

The skilled reader will appreciate that the particles of the invention will have utility in a very wide range of industrial applications. Examples include catalysis, sensors, medical devices, energy storage devices, advanced materials and optical devices.

The invention claimed is:

1. A particle including a plurality of stacked sub-structures, each sub-structure including a stack of graphene layers, in which the separation between successive stacked sub-structures is greater than the separation between successive graphene layers in each sub-structure, wherein the sub-structures have a net negative charge.

2. A particle according to claim 1 in which the separation between successive stacked sub-structures is in the range 2 to 100 nm.

3. A particle according to claim 1 in which the sub-substructures each have a stack thickness which is in the range 0.7 to 15 nm.

4. A particle according to claim 1 in which each sub-structure includes a stack of between 2 and 12 graphene layers.

5. A particle according to claim 1 in which the sub-structures each have a stack thickness, and the stack thicknesses are less than the separation between successive stacked sub-structures.

6. A particle according to claim 1 having a thickness in the range 0.7 to 5 microns.

7. A particle according to claim 1 having a width in the range of 1 to 15 microns.

8. A particle according to claim 1 which has Stone-Wales defects.

9. A particle according to claim 1 which has a carbon content of greater than 80 wt. %.

10. A particle according to claim 1 in which at least some of the graphene layers in the sub-structures are doped and/or surface modified.

11. A particle according to claim 10 in which at least some of the graphene layers are surface modified by functionalisation.

12. A particle according to claim 10 in which at least some of the graphene layers are surface modified by decoration with a material.

13. A particle according to claim 12 in which the material is silicon, sulfur or selenium.

14. A particle according to claim 12 in which the material is a metal.

15. A particle according to claim 14 in which the metal is one or more of silver, gold, platinum, copper and iron.

16. A particle according to claim 1 further including an intercalated substance which is intercalated between successive stacked sub-structures.

17. A particle according to claim 16 in which the intercalated substance is sulfur or hydrogen.

18. Particulate material including a plurality of particles according to claim 1.

19. Particulate material according to claim 18 having a surface area in the range 15 to 70 $m^2g^{-1}$.

20. Particulate material according to claim 18 which is crystalline.

21. Particular material according to claim 18 made by subjecting a starting material to a plasma treatment.

22. A particle according to claim 1 in which the separation between successive stacked sub-structures is in the range 5 to 50 nm.

23. A particle according to claim 1 in which the separation between successive stacked sub-structures is in the range 10 to 20 nm.

24. A particle according to claim 1 in which the sub-substructures each have a stack thickness which is in the range 0.7 to 4 nm.

25. A particle according to claim 1 having a thickness in the range 1 to 5 microns.

26. A particle according to claim 1 having a thickness in the range 1.5 to 3 microns.

27. A particle according to claim 1 having a width in the range of 2 to 5 microns.

28. A particle according to claim 1 which has a carbon content of greater than 90 wt. %.

29. A particle according to claim 12 in which the material is a transition metal.

30. A method of making particulate material according to claim 18 including subjecting a starting material to a plasma treatment.

31. A method according to claim 30 in which the plasma treatment includes generating plasma using a plurality of electrodes which are moved during the plasma treatment to agitate the starting material and/or the particulate material.

* * * * *